US010008006B2

(12) United States Patent
Koga

(10) Patent No.: US 10,008,006 B2
(45) Date of Patent: Jun. 26, 2018

(54) IMAGE PROCESSING CONTROL METHOD AND APPARATUS

(71) Applicant: FUJITSU LIMITED, Kawasaki-shi, Kanagawa (JP)

(72) Inventor: Susumu Koga, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/424,047

(22) Filed: Feb. 3, 2017

(65) Prior Publication Data

US 2017/0228934 A1    Aug. 10, 2017

(30) Foreign Application Priority Data

Feb. 9, 2016    (JP) .................................. 2016-023050

(51) Int. Cl.
```
G09G 5/00      (2006.01)
G06T 7/70      (2017.01)
G06F 3/01      (2006.01)
G06F 3/14      (2006.01)
G09G 5/12      (2006.01)
```

(52) U.S. Cl.
CPC ................ *G06T 7/70* (2017.01); *G06F 3/011* (2013.01); *G06F 3/14* (2013.01); *G09G 5/12* (2013.01); *G06T 2207/20221* (2013.01); *G09G 2330/021* (2013.01)

(58) Field of Classification Search
CPC ....... G06T 19/006; G06T 19/00; G06F 3/011; G06F 3/012; G02B 27/017
See application file for complete search history.

(56) References Cited

U.S. PATENT DOCUMENTS

| 5,933,125 A * | 8/1999 | Fernie ................. G02B 27/017 345/619 |
| 9,369,594 B2 * | 6/2016 | Yoda .................. H04N 1/00363 |
| 9,373,196 B2 * | 6/2016 | Fukuchi ................. G06F 3/011 |
| 2010/0026714 A1 * | 2/2010 | Utagawa .............. G02B 27/017 345/633 |

(Continued)

FOREIGN PATENT DOCUMENTS

| JP | 2014-96074 | 5/2014 |
| WO | WO 2015/098292 A1 | 7/2015 |

*Primary Examiner* — Abderrahim Merouan
(74) *Attorney, Agent, or Firm* — Oblon, McClelland, Maier & Neustadt, L.L.P.

(57) ABSTRACT

A control method includes acquiring a first image, determining whether the first image is a transmission target to another computer, when the determining determines that the first image is an image as the transmission target, (1) executing detection processing of detecting a reference object from the image, (2) generating image information of a superposition image in which a content image corresponding to the reference object detected by the detection processing is superimposed over the image when the reference object is detected from the image, (3) transmitting the image information to the other computer, and (4) acquiring a second image which is photographed after the first image for next determining, and when the determining determines that the first image is not the image as the transmission target, acquiring the second image for the next determining rather than the detection processing and the generating of the image information.

17 Claims, 10 Drawing Sheets

(56) References Cited

U.S. PATENT DOCUMENTS

| | | | |
|---|---|---|---|
| 2011/0304640 A1* | 12/2011 | Noge | G06T 19/006 |
| | | | 345/589 |
| 2012/0113463 A1* | 5/2012 | Nogawa | H04N 1/0023 |
| | | | 358/1.15 |
| 2014/0132536 A1 | 5/2014 | Ikenaga et al. | |
| 2015/0070389 A1* | 3/2015 | Goto | G06T 7/00 |
| | | | 345/633 |
| 2016/0209916 A1* | 7/2016 | Sendai | G02B 27/0172 |
| 2016/0252955 A1 | 9/2016 | Yamamoto et al. | |

* cited by examiner

IMAGE PROCESSING CONTROL METHOD AND APPARATUS

CROSS-REFERENCE TO RELATED APPLICATION

This application is based upon and claims the benefit of priority of the prior Japanese Patent Application No. 2016-023050, filed on Feb. 9, 2016, the entire contents of which are incorporated herein by reference.

FIELD

The embodiments discussed herein are related to control of image processing.

BACKGROUND

The augmented reality (AR) technique is used. For example, in the AR technique, image processing of superimposing virtual AR content on a taken image obtained by photographing by a camera is executed. By displaying the superposition image on which the AR content is superimposed in this manner, various kinds of information may be added to an image and the image may be displayed. For example, a smartphone and a head-mounted display are used and the smartphone executes image processing of superimposing AR content on each of taken images sequentially obtained by photographing by a camera and sequentially transmits superposition images to the head-mounted display. The head-mounted display displays the superposition images. This may add various kinds of information to the taken images and provide the resulting images for a user who wears the head-mounted display. As a technique for displaying images on another apparatus in this manner, image sharing techniques such as Miracast exist.

Related arts are disclosed in International Publication Pamphlet No. WO 2015/098292, Japanese Laid-open Patent Publication No. 2014-96074, and so forth.

SUMMARY

According to an aspect of the embodiments, a control method includes acquiring a first image, determining whether the first image is a transmission target to another computer, when the determining determines that the first image is an image as the transmission target, (1) executing detection processing of detecting a reference object from the image, (2) generating image information of a superposition image in which a content image corresponding to the reference object detected by the detection processing is superimposed over the image when the reference object is detected from the image, (3) transmitting the image information to the other computer, and (4) acquiring a second image which is photographed after the first image for next determining, and when the determining determines that the first image is not the image as the transmission target, acquiring the second image for the next determining rather than the detection processing and the generating of the image information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

If the image processing of superimposing AR content on each taken image obtained by photographing by a camera is executed, it is difficult to suppress the power consumption in some cases.

In one aspect, the embodiments discussed herein intend to suppress the power consumption.

The embodiments of an image processing control method, an image processing control program, and image processing control apparatus will be described in detail below based on the drawings. Techniques of the disclosure are not limited by the embodiments. Furthermore, the respective embodiments may be combined with each other as appropriate within a range in which contradiction of the contents of processing is not caused.

Embodiment 1

[System Configuration]

Figure 1:
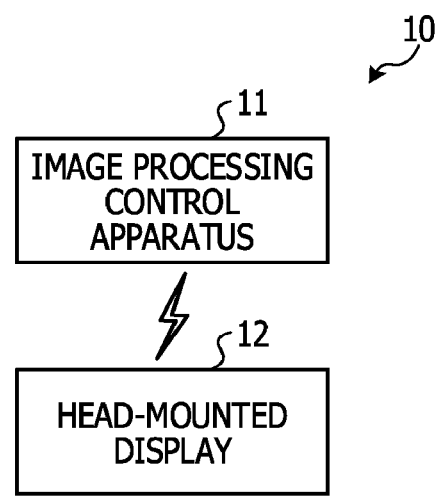
FIG. 1 is a diagram for explaining one example of a system configuration.

First, one example of a system that provides virtual reality will be described. FIG. 1 is a diagram for explaining one example of a system configuration. A system 10 is an AR system that provides virtual reality. The system 10 includes an image processing control apparatus 11 and a head-mounted display 12.

The image processing control apparatus 11 is an apparatus that provides virtual reality. For example, the image processing control apparatus 11 is a portable information processing apparatus or the like such as a smartphone or a tablet terminal carried by a user who utilizes the provided virtual reality.

The head-mounted display 12 is a device that is mounted on the head of the user and visibly displays various kinds of information to the user. In the present embodiment, the head-mounted display 12 is a device corresponding to only a single eye. However, the head-mounted display 12 may be a device corresponding to both eyes. The head-mounted display 12 may be a device including a transmissive display unit in a lens part so that the user is allowed to visually recognize the real environment of the external even when the head-mounted display 12 is kept mounted on the user. Furthermore, the head-mounted display 12 may be a device with which a non-transmissive display unit is located at part of the field of view of the user when the user wears the head-mounted display 12 on the head. In the present embodiment, in the head-mounted display 12, one non-transmissive display unit is provided opposed to one eye (for example, right eye) of the user. The head-mounted display 12 and the image processing control apparatus 11 are communicably coupled by wireless communications of Bluetooth (registered trademark), a wireless local area network (LAN), or the like. The head-mounted display 12 is provided with a camera and photographing of an image of the direction of the line of sight of the user who wears the head-mounted display 12 is enabled by the camera. The head-mounted display 12 transmits a taken image obtained by photographing by the camera to the image processing control apparatus 11. Furthermore, the head-mounted display 12 displays an image received from the image processing control apparatus 11 on the display unit.

In the system 10 according to the present embodiment, object data of various kinds of AR content is stored in the image processing control apparatus 11 in advance. The object data of AR content may be downloaded from a server or may be stored via a storage medium or the like. The image processing control apparatus 11 provides virtual reality to the user through the head-mounted display 12. For example, the user wears the head-mounted display 12, carries the image processing control apparatus 11 that stores AR content, and executes photographing by the camera of the head-mounted display 12. The head-mounted display 12 transmits a taken image obtained by photographing by the camera to the image processing control apparatus 11. The image processing control apparatus 11 detects a reference object from the taken image obtained by the photographing. Based on detection of inclusion of the reference object in the taken image, the image processing control apparatus 11 superimposes (synthesizes) AR content according to the reference object on the taken image with a size according to the size of the reference object. The image processing control apparatus 11 transmits the superposition image obtained by superimposing the AR content on the taken image to the head-mounted display 12. Here, in the present embodiment, the image processing control apparatus 11 is made to display the superposition image on which the AR content is superimposed and the superposition image is transmitted to the head-mounted display 12 by using an image sharing technique. The head-mounted display 12 displays the superposition image received from the image processing control apparatus 11. The reference object may be a marker serving as a basis for specifying the position at which virtual reality is displayed, such as an AR marker or a quick response (QR) code (registered trademark). Furthermore, the reference object may be an object in a taken image, such as an object having a specific shape or a specific pattern.

In the present embodiment, description will be made by taking the case of assisting check work in a factory by the system 10 as an example. For example, in the factory, AR markers are disposed at target objects of the check or around the target objects. A unique image is recorded in each of the AR markers. For example, a pattern image obtained by turning a unique marker identification (ID) to a code is recorded in each of the AR markers as identification information. Meanwhile, object data of AR content is stored in the image processing control apparatus 11. For example, pieces of AR content indicating items to which attention is to be paid in the check, such as the contents of the check, words of caution, the previous check result, and the check procedure, are stored in the image processing control apparatus 11. For each piece of AR content, a unique content ID is defined as identification information. In the image processing control apparatus 11, in association with the marker ID of an AR marker, the content ID of AR content to be displayed as virtual reality in a superimposed manner on a target object of the check for which this AR marker is disposed is stored. A worker who carries out the check goes to the place of the target object of the check while wearing the head-mounted display 12 and carrying the image processing control apparatus 11. Then, the worker who carries out the check photographs an AR marker disposed at the target object or around the target object by the camera provided in the head-mounted display 12. The head-mounted display 12 transmits a taken image obtained by the photographing by the camera to the image processing control apparatus 11. The image processing control apparatus 11 recognizes the marker ID of the AR marker from the taken image and reads out AR content of the content ID associated with the marker ID of the AR marker. Then, the image processing control apparatus 11 generates a superposition image obtained by superimposing the read AR content on the photographed image and transmits the superposition image to the head-mounted display 12. The head-mounted display 12 displays the superposition image received from the image processing control apparatus 11. Due to this, for example, the superposition image in which content indicating items to which attention is to be paid in the check, such as the contents of the check, words of caution, the previous check result, and the check procedure, is superimposed on the target object of the check is displayed on the head-mounted display 12. As a result, the worker who carries out the check may understand the items to which attention is to be paid in the check from the displayed content and thus efficiently carry out the check.

[Configuration of Head-Mounted Display]

Figure 2:
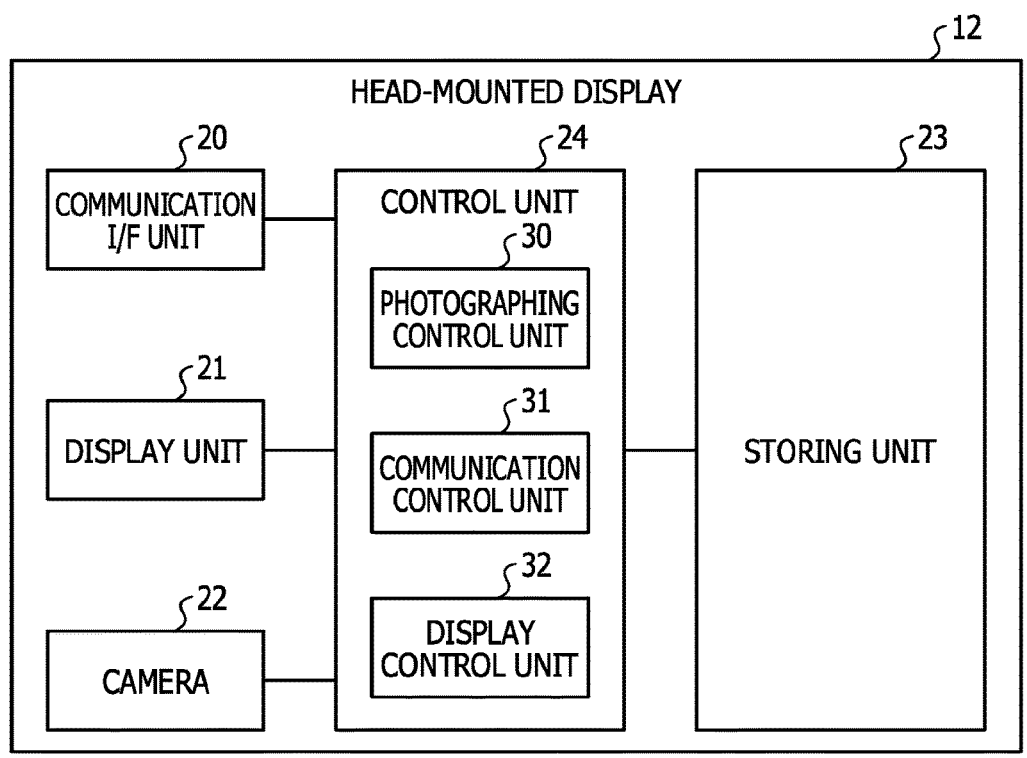
FIG. 2 is a diagram schematically illustrating a functional configuration of a head-mounted display.

Next, the configuration of each of the pieces of equipment will be described. First, the configuration of the head-mounted display 12 will be described. FIG. 2 is a diagram schematically illustrating a functional configuration of a head-mounted display. The head-mounted display 12 includes a communication interface (I/F) unit 20, a display unit 21, a camera 22, a storing unit 23, and a control unit 24. The head-mounted display 12 may include other pieces of equipment than the above-described pieces of equipment.

The communication I/F unit 20 is an interface that carries out communication control with another apparatus. The communication I/F unit 20 transmits and receives various kinds of information with the other apparatus by wireless communications. For example, the communication I/F unit 20 transmits image data of a taken image obtained by photographing by the camera 22 to the image processing control apparatus 11. Furthermore, the communication I/F unit 20 receives image data for displaying from the image processing control apparatus 11.

The display unit 21 is a device that displays various kinds of information. The display unit 21 is provided in the head-mounted display 12 in such a manner as to be opposed to one eye of a user when the user wears the head-mounted display 12. The display unit 21 displays various kinds of information based on control from the control unit 24. For example, the display unit 21 displays a superposition image transmitted by an image sharing technique from the image processing control apparatus 11.

The camera 22 is a device that photographs an image by using an imaging element such as a charge coupled device (CCD) or a complementary metal oxide semiconductor (CMOS). The camera 22 is provided in the head-mounted display 12 in such a manner as to be oriented in the front direction of a user when the user wears the head-mounted display 12, and is allowed to photograph an image of the direction of the line of sight of the user who faces the front. The camera 22 photographs an image and outputs image data of a taken image obtained by the photographing based on control from the control unit 24.

The storing unit 23 is a storing device that stores various kinds of information. For example, the storing unit 23 is a data-rewritable semiconductor memory such as a random access memory (RAM), a flash memory, or a non-volatile static (NVS) RAM. The storing unit 23 may be a storing apparatus such as a hard disk, a solid-state drive (SSD), or an optical disc.

The storing unit 23 stores a control program and various kinds of programs executed in the control unit 24. Moreover, the storing unit 23 stores various kinds of data used in the program executed in the control unit 24.

The control unit 24 is a device that controls the head-mounted display 12. As the control unit 24, an electronic circuit such as a central processing unit (CPU) or a micro-processing unit (MPU) or an integrated circuit such as an application specific integrated circuit (ASIC) or a field programmable gate array (FPGA) may be employed. The control unit 24 includes an internal memory for storing a program in which various kinds of processing procedures are prescribed and control data and executes various kinds of processing based on the program and the control data.

The control unit 24 functions as various kinds of processing units through operation of various kinds of programs. For example, the control unit 24 includes a photographing control unit 30, a communication control unit 31, and a display control unit 32.

The photographing control unit 30 controls the camera 22 to photograph an image. For example, the photographing control unit 30 photographs a moving image by the camera 22 at a given frame rate.

The communication control unit 31 controls transmission and reception of various kinds of information. For example, the communication control unit 31 transmits image data of a taken image obtained by photographing by the camera 22 to the image processing control apparatus 11. Furthermore, the communication control unit 31 receives image data for displaying from the image processing control apparatus 11.

The display control unit 32 controls displaying of various kinds of information on the display unit 21. For example, the display control unit 32 carries out control to display an image of image data received from the image processing control apparatus 11 on the display unit 21.

[Configuration of Image Processing Control Apparatus]

Figure 3:
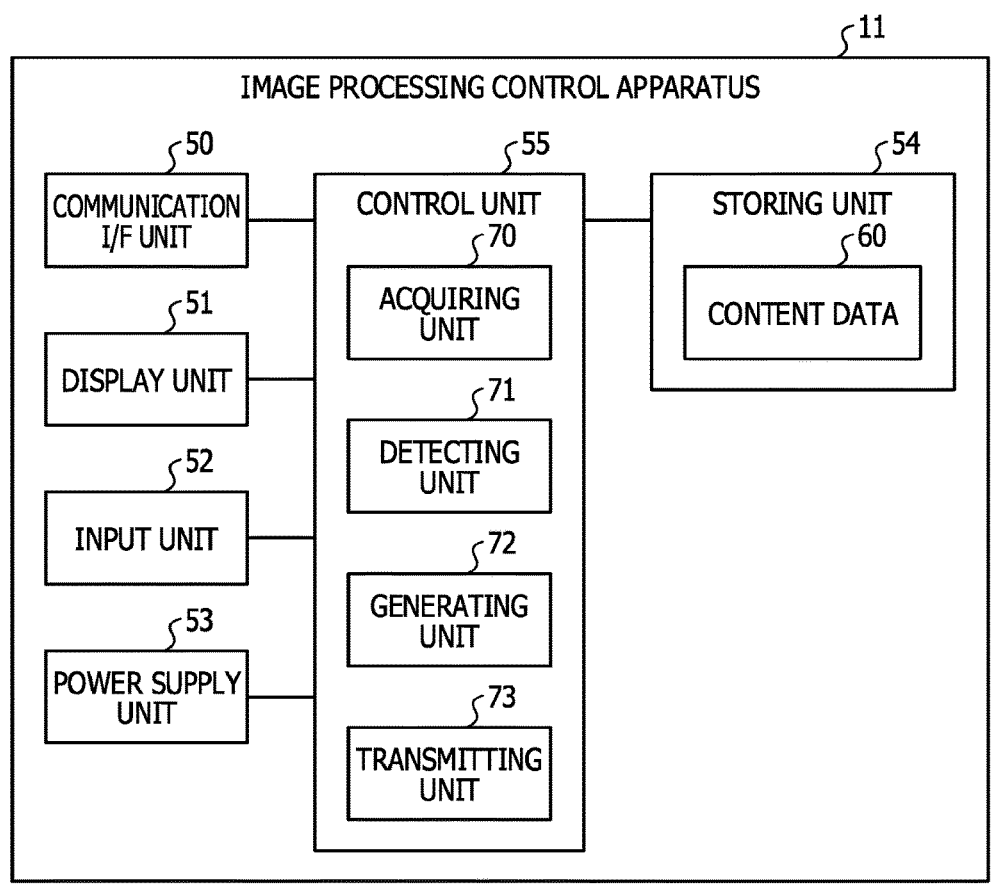
FIG. 3 is a diagram schematically illustrating a functional configuration of an image processing control apparatus according to embodiment 1.

Next, the configuration of the image processing control apparatus 11 will be described. FIG. 3 is a diagram schematically illustrating a functional configuration of an image processing control apparatus according to embodiment 1. As illustrated in FIG. 3, the image processing control apparatus 11 includes a communication I/F unit 50, a display unit 51, an input unit 52, a power supply unit 53, a storing unit 54, and a control unit 55. The image processing control apparatus 11 may include another piece of equipment which a portable information processing apparatus or computer includes, besides the above-described pieces of equipment.

The communication I/F unit 50 is an interface that carries out communication control with another apparatus. For example, the communication I/F unit 50 carries out transmission and reception of various kinds of information with the head-mounted display 12 by wireless communications. For example, the communication I/F unit 50 receives image data of a taken image obtained by photographing by the camera 22 from the head-mounted display 12. Furthermore, the communication I/F unit 50 transmits image data for displaying to the head-mounted display 12.

The display unit 51 is a display device that displays various kinds of information. As the display unit 51, display devices such as a liquid crystal display (LCD) are cited. The display unit 51 displays various kinds of information. For example, the display unit 51 displays various kinds of operation screens and a superposition image on which AR content is superimposed.

The input unit 52 is an input device to input various kinds of information. For example, as the input unit 52, input devices such as various kinds of buttons provided in the image processing control apparatus 11 and a transmissive touch sensor provided on the display unit 51 are cited. In the example of FIG. 3, the display unit 51 and the input unit 52 are separated as different units because the functional configuration is illustrated. However, for example, the display unit 51 and the input unit 52 may be configured by a device in which the display unit 51 and the input unit 52 are integrally provided, such as a touch panel.

The power supply unit 53 includes a power supply such as a battery or an electric cell and supplies power to the respective electronic parts of the image processing control apparatus 11.

The storing unit 54 is a storing apparatus such as a hard disk, an SSD, or an optical disc. The storing unit 54 may be a data-rewritable semiconductor memory such as a RAM, a flash memory, or an NVSRAM.

The storing unit 54 stores an operating system (OS) and various kinds of programs executed in the control unit 55. For example, the storing unit 54 stores programs to execute various kinds of processing including information processing to be described later. Moreover, the storing unit 54 stores various kinds of data used in the program executed in the control unit 55. For example, the storing unit 54 stores content data 60.

The content data 60 is data in which object data of AR content is stored. For example, in the content data 60, object data in which items to which attention is to be paid in a check, such as the contents of the check, words of caution, the previous check result, and the check procedure, are indicated is stored. The AR content may be object data of a three-dimensional, stereoscopic shape. For each piece of AR content of the content data 60, a unique content ID is defined as identification information.

The control unit 55 is a device that controls the image processing control apparatus 11. As the control unit 55, an electronic circuit such as a CPU or an MPU or an integrated circuit such as an ASIC or an FPGA may be employed. The control unit 55 includes an internal memory for storing a program in which various kinds of processing procedures are prescribed and control data and executes various kinds of processing based on the program and the control data. The control unit 55 functions as various kinds of processing units through operation of various kinds of programs. For example, the control unit 55 includes an acquiring unit 70, a detecting unit 71, a generating unit 72, and a transmitting unit 73.

The acquiring unit 70 carries out various kinds of acquisition. For example, the acquiring unit 70 sequentially acquires image data of taken images that are transmitted from the head-mounted display 12 and are received by the communication I/F unit 50.

The detecting unit 71 carries out various kinds of detection. For example, the detecting unit 71 executes detection processing a reference object from the taken image represented by the image data sequentially acquired by the acquiring unit 70. For example, the detecting unit 71 carries out detection of an AR marker regarding the taken image represented by the image data. If an AR marker is detected, the detecting unit 71 identifies the size of the detected AR marker in the taken image.

The generating unit 72 carries out various kinds of generation. For example, if an AR marker is detected by the detecting unit 71, the generating unit 72 generates a superposition image by executing processing of superimposing an image corresponding to the AR marker on the taken image in which the AR marker is detected. For example, if an AR marker is detected, the generating unit 72 decodes a pattern image of the AR marker and identifies a marker ID. The generating unit 72 reads out object data of an identified content ID from the content data 60. Then, the generating unit 72 superimposes AR content of the read object data on the taken image with a size according to the size of the AR marker.

Here, in the system 10 according to the present embodiment, the image processing control apparatus 11 transfers a screen to the head-mounted display 12 to cause the head-mounted display 12 to display the screen based on an image sharing technique. However, the screen update cycle of the image processing control apparatus 11 and the screen update cycle of the head-mounted display 12 are not identical and a relationship of the screen update cycle [fps] of the image processing control apparatus 11>the screen update cycle [fps] of the head-mounted display 12 is satisfied.

Figure 4:
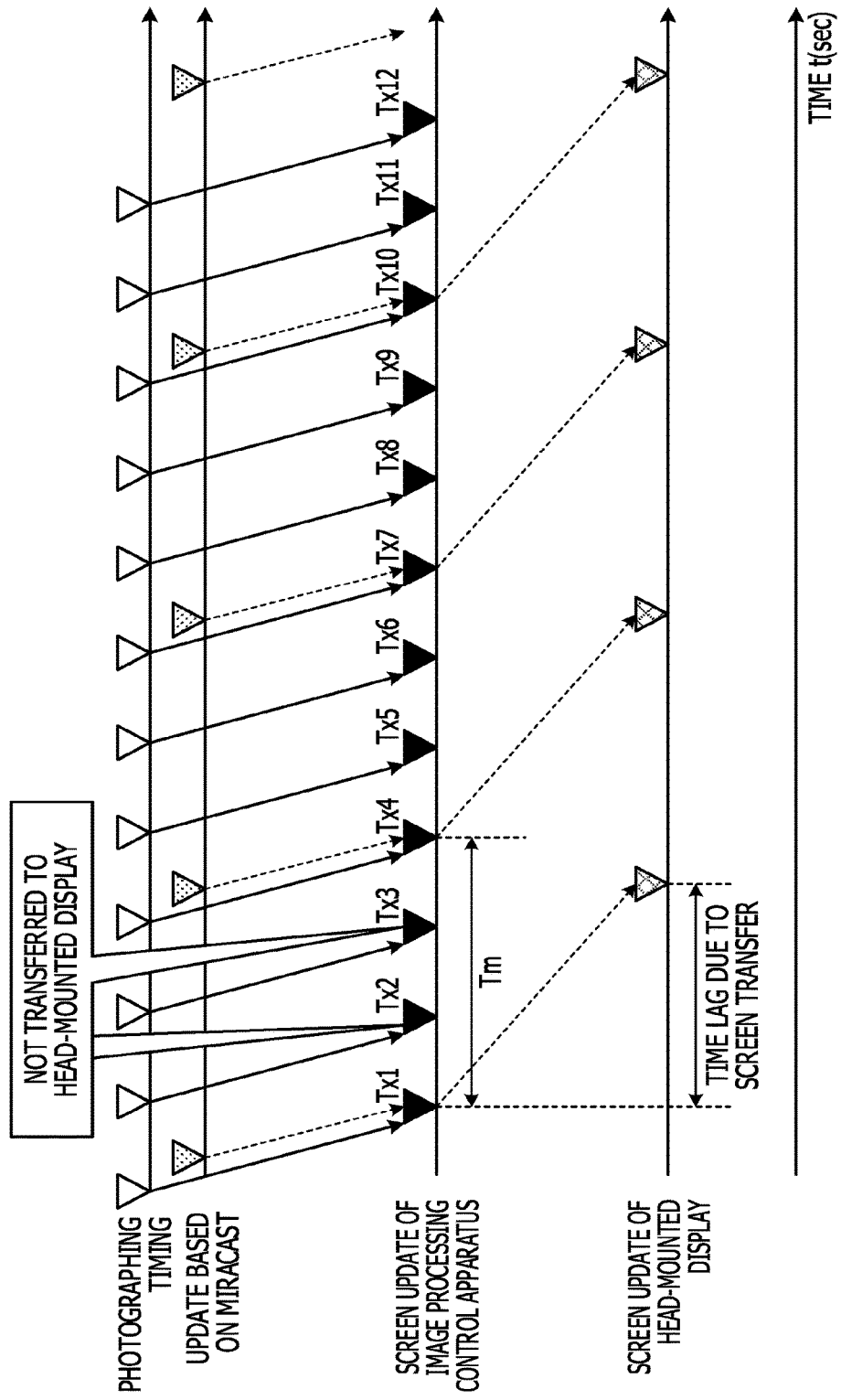
FIG. 4 is a diagram illustrating one example of photographing timings and screen update timings.

FIG. 4 is a diagram illustrating one example of photographing timings and screen update timings. In the present embodiment, it is assumed that the cycle of photographing by the head-mounted display 12 and the image update cycle of the image processing control apparatus 11 are both the same cycle (for example, 60 [fps]) for simplification of description. The cycle of photographing by the head-mounted display 12 and the image update cycle of the image processing control apparatus 11 may be different. In the example of FIG. 4, description will be made by taking the case of using Miracast as the image sharing technique as an example. However, the image sharing technique is not limited to the Miracast.

In the example of FIG. 4, the head-mounted display 12 transmits, to the image processing control apparatus 11, image data of taken images obtained by photographing at the photographing timings of every photographing cycle. The image processing control apparatus 11 superimposes an image corresponding to an AR marker on the taken images sequentially acquired, and displays superposition images on the screen at the screen update timings according to the image update cycle of the image processing control apparatus 11. Meanwhile, when an update timing based on the Miracast comes, the image processing control apparatus 11 transmits image data of an image of the screen immediately after the update timing to the head-mounted display 12. The head-mounted display 12 displays the image of the screen represented by the received image data. A time lag including the transfer time of the image data and so forth exists before the displaying of the image of the screen on the head-mounted display 12.

By the way, in the system 10 according to the present embodiment, the user sees only the screen of the head-mounted display 12 basically when the user wears the head-mounted display 12. For this reason, in the image processing control apparatus 11, in the case of executing the image processing of superimposing AR content on the respective taken images obtained by photographing by the camera 22, the processing of superimposing an image is executed also for the taken images that are not transmitted to the head-mounted display 12. In this image superposition processing for the taken images that are not transmitted to the head-mounted display 12, useless power consumption is caused. Because the image processing control apparatus 11 is supplied with power from a battery, an electric cell, or the like, the occurrence of the useless power consumption shortens the operating time of the image processing control apparatus 11.

Accordingly, the detecting unit 71 executes detection processing of the reference object regarding the taken images of the transmission target among the plural taken images acquired. For example, the detecting unit 71 obtains a time interval Ts at which image data of the taken image is acquired in the communication I/F unit 50. For example, if cycle information of photographing, such as the frame rate of photographing, is stored, the detecting unit 71 may obtain the time interval Ts of acquisition of image data of the taken image from the cycle information. Alternatively, the detecting unit 71 may calculate plural time intervals of acquisition of image data and obtain the average of the time intervals as the time interval Ts. Furthermore, the detecting unit 71 obtains a time interval Tm of the update timing of the image based on the Miracast. For example, if setting information on the time interval Tm of the update timing of the image based on the Miracast is stored, the detecting unit 71 may obtain the time interval Tm of the update timing by reading out the setting information. Alternatively, the detecting unit 71 may calculate plural time intervals of the update timing of the image based on the Miracast and obtain the average of the time intervals as the time interval Tm. Moreover, the detecting unit 71 obtains a processing time relating to AR. For example, the detecting unit 71 obtains the processing time relating to AR from the start of detection of an AR marker regarding a taken image to execution of image processing of superimposing an image corresponding to the AR marker on the taken image and displaying on the screen. For example, if a detection time Tid it takes to detect an AR marker and an AR content display processing time Tar it takes to superimpose AR content corresponding to the AR marker on a taken image and display the resulting image are main times in the processing time relating to AR, the detecting unit 71 obtains the detection time Tid and the AR content display processing time Tar. For example, if time information of the detection time Tid and the AR content display processing time Tar is stored, the detecting unit 71 may obtain the detection time Tid and the AR content display processing time Tar from the time information. Alternatively, the detecting unit 71 may calculate plural times regarding each of the detection time it takes to detect an AR marker and the time it takes to superimpose AR content corresponding to the AR marker on a taken image and display the resulting image, and obtain the averages of the respective times as the detection time Tid and the AR content display processing time Tar. The detecting unit 71 obtains the timing of transmission of the taken image of the transmission target regarding which the clock time in the case in which the image processing of superimposing the image corresponding to the AR marker on the taken image is executed is immediately before the next update timing of the image based on the Miracast.

Figure 5:
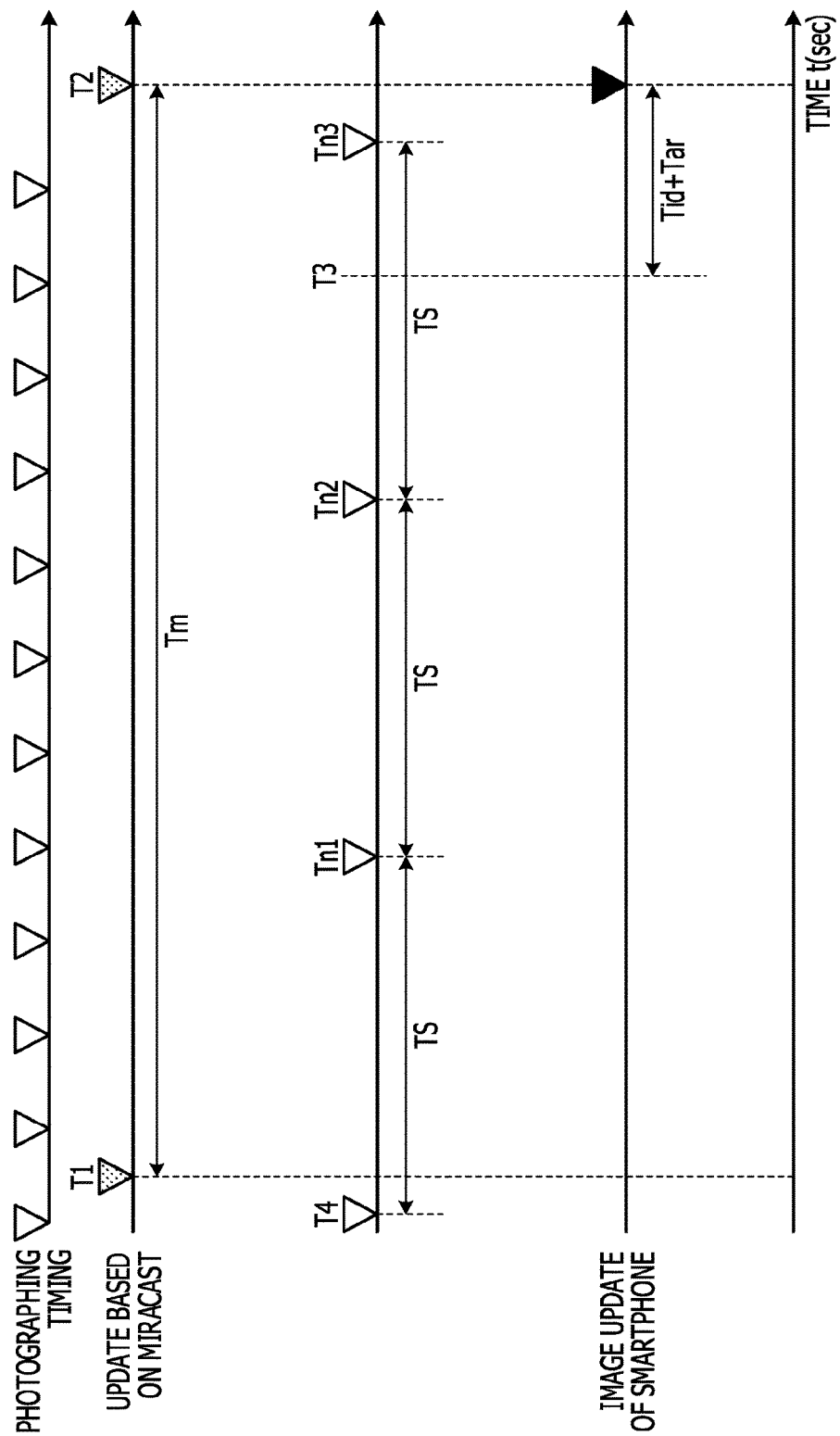
FIG. 5 is a diagram illustrating one example of how to obtain a timing of transmission of a taken image of a transmission target.

FIG. 5 is a diagram illustrating one example of how to obtain a timing of transmission of a taken image of a transmission target. For example, the detecting unit 71 obtains a clock time T2 after the time interval Tm from an immediately-previous update timing T1 based on the Miracast. The detecting unit 71 obtains a clock time T3 earlier than the clock time T2 by detection time Tid+AR content display processing time Tar. The detecting unit 71 obtains clock times Tn1, Tn2, Tn3 . . . after the elapse of the time intervals Ts from a clock time T4 at which image data of the immediately-previous taken image is acquired. The detecting unit 71 obtains the clock time immediately before the clock time T3 among the clock times Tn1, Tn2, Tn3 . . . . In the example of FIG. 5, the clock time Tn2 is before the clock time T3 and the clock time Tn3 is after the clock time T3. Thus, the detecting unit 71 obtains the clock time Tn2 as the clock time immediately before the clock time T3.

The detecting unit 71 deems a taken image acquired within a given allowed time based on the clock time Tn2 as the taken image of the transmission target and executes the detection processing of an AR marker. On the other hand, the detecting unit 71 skips the detection processing of an AR marker regarding the taken images of the clock times Tn1 and Tn3, which are not deemed as the transmission target. For example, the detecting unit 71 does not execute the detection processing of an AR marker regarding the taken images that are not deemed as the transmission target. The detecting unit 71 may count the number of acquired taken images and discriminate the taken image of the transmission target. For example, in the example of FIG. 5, the taken image of the clock time Tn2 is the second taken image from the taken image of the clock time T4. The detecting unit 71 may deem the taken image obtained as the second taken image from the taken image of the clock time T4 as the taken image of the transmission target and execute the detection processing of an AR marker.

If an AR marker is detected in the taken image of the transmission target, the generating unit 72 generates a superposition image by executing processing of superimposing an image corresponding to the AR marker on the taken image in which the AR marker is detected. In the example of FIG. 5, if an AR marker is detected in the taken image acquired at the clock time Tn2, the generating unit 72 generates a superposition image by superimposing an image corresponding to the AR marker on the taken image of the clock time Tn2.

When an update timing based on the Miracast comes, the transmitting unit 73 transmits image data of the image of the screen displayed at the update timing to the head-mounted display 12. In the example of FIG. 5, when the present clock time becomes a clock time T2 of the immediate update timing based on the Miracast, the transmitting unit 73 transmits, to the head-mounted display 12, image data of the superposition image obtained by superimposing the image corresponding to the AR marker on the taken image acquired at the clock time Tn2.

The head-mounted display 12 displays the superposition image of the image data received from the image processing control apparatus 11 on the display unit 21.

Figure 6:
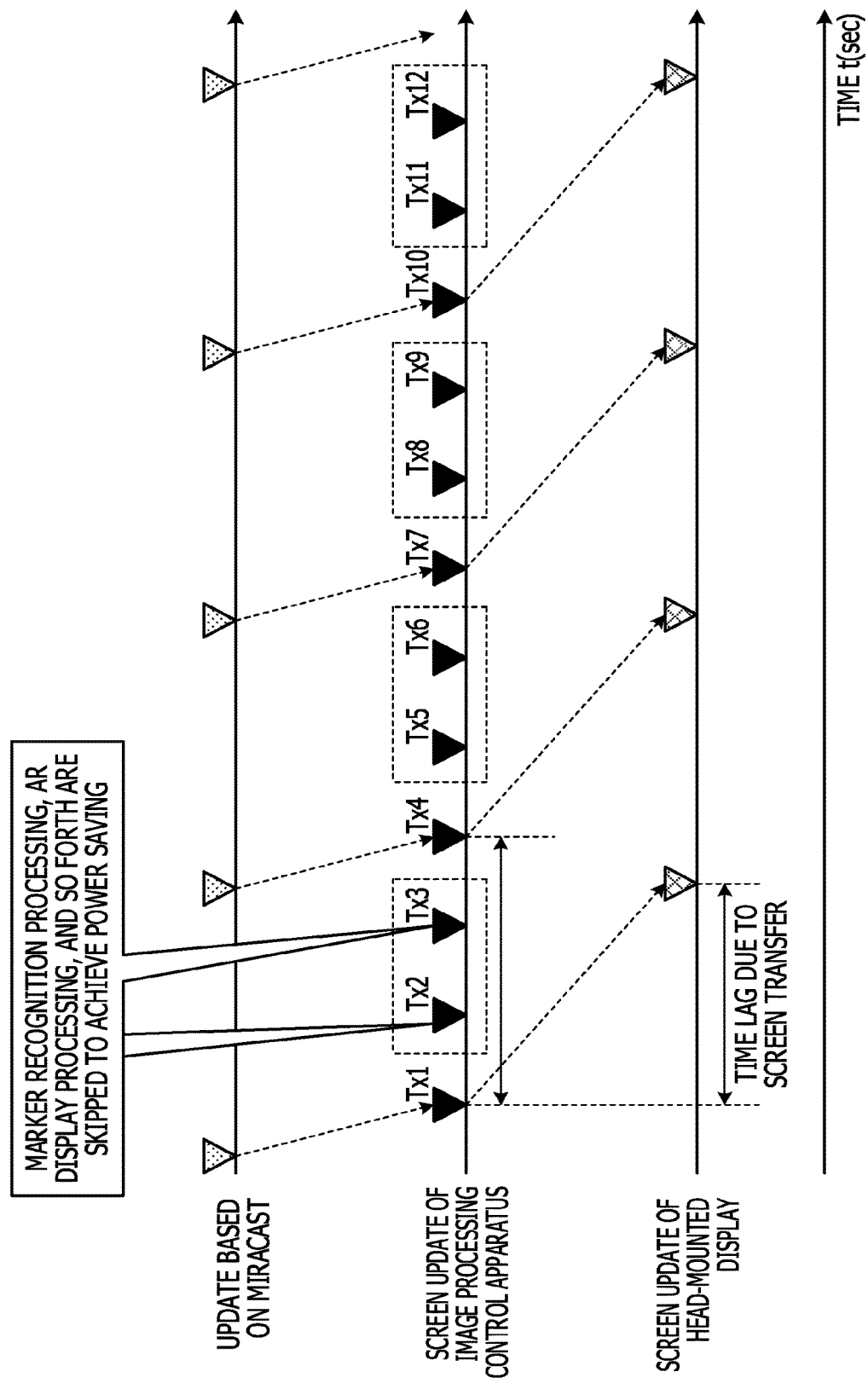
FIG. 6 is a diagram illustrating one example of photographing timings and screen update timings.

FIG. 6 is a diagram illustrating one example of photographing timings and screen update timings. If an AR marker is detected in taken images of Tx1, Tx4, Tx7, and Tx10 as the transmission target to the head-mounted display 12, the image processing control apparatus 11 superimposes an image corresponding to the AR marker on the taken images and transmits image data of superposition images to the head-mounted display 12. On the other hand, the image processing control apparatus 11 skips the processing of superimposing the AR content regarding taken images of Tx2, Tx3, Tx5, Tx6, Tx8, Tx9, Tx11, and Tx12, which are not the transmission target to the head-mounted display 12. Due to this, the image processing control apparatus 11 becomes free from the superposition processing of the image for the taken images that are not transmitted to the head-mounted display 12 and thus the power consumption may be suppressed.

Figure 7:
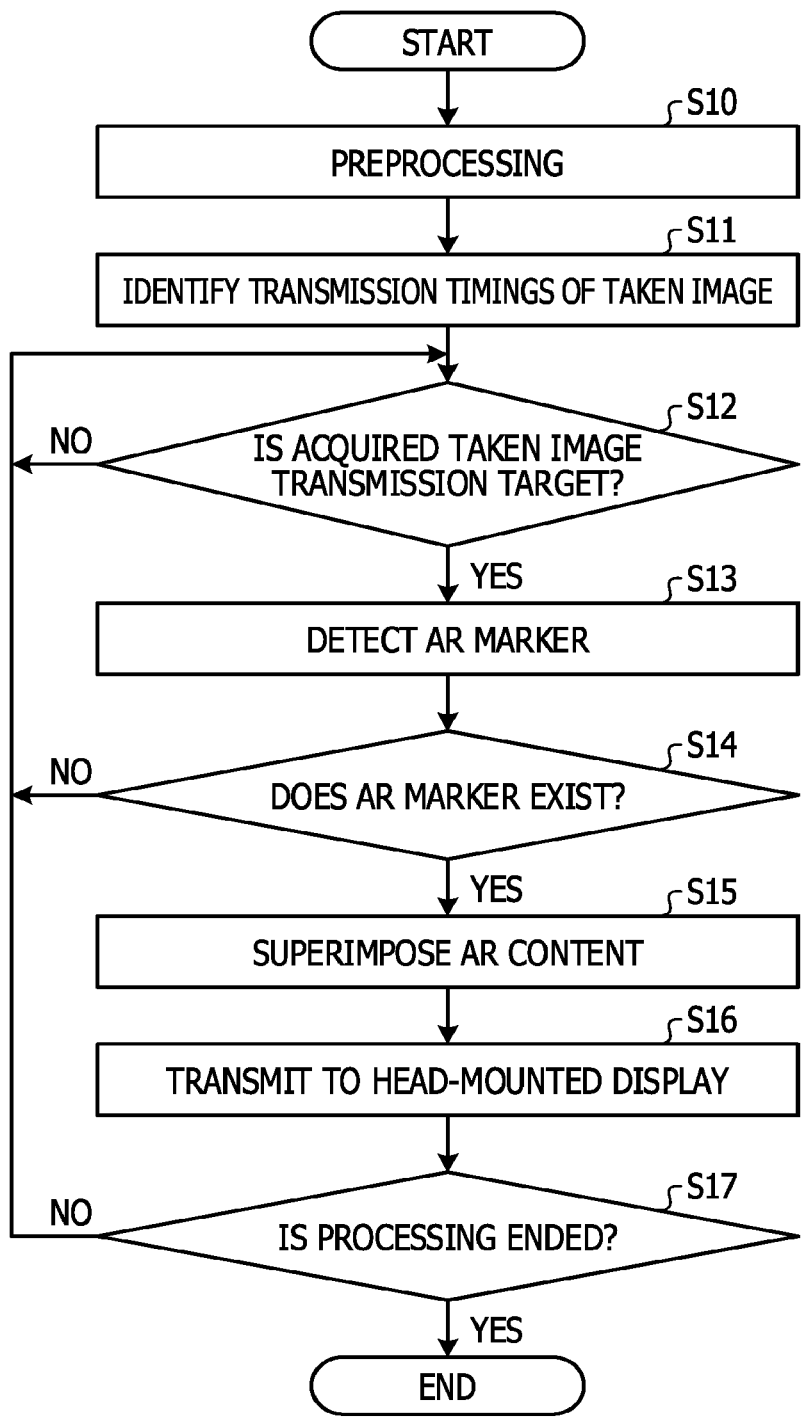
FIG. 7 is a flowchart illustrating one example of a procedure of control processing.

Next, the flow of control processing to control image processing of superimposing AR content on a taken image by the image processing control apparatus 11 according to the present embodiment will be described. FIG. 7 is a flowchart illustrating one example of a procedure of a control processing. This control processing is executed at a given timing, for example, at the timing at which given operation to order the start of processing of AR is carried out in the image processing control apparatus 11. The control processing may be executed at the timing at which image data of a taken image is received from the head-mounted display 12.

As illustrated in FIG. 7, the detecting unit 71 executes preprocessing of acquiring various kinds of parameters used for the control (S10). For example, the detecting unit 71 calculates plural time intervals of acquisition of image data in the acquiring unit 70 and obtains the average of the time intervals as the time interval Ts. Furthermore, the detecting unit 71 may calculate plural time intervals of the update timing of the image based on the Miracast and obtain the average of the time intervals as the time interval Tm. Moreover, the detecting unit 71 calculates plural times regarding each of the detection time it takes to detect an AR marker and the time it takes to superimpose AR content corresponding to the AR marker on a taken image and display the resulting image, and obtains the averages of the respective times as the detection time Tid and the AR content display processing time Tar.

The detecting unit 71 identifies the timings of transmission of the taken image of the transmission target (S11). When a taken image is acquired from the head-mounted display 12 in the acquiring unit 70, the detecting unit 71 determines whether the acquired taken image is the taken image of the transmission target (S12). For example, the acquiring unit 70 determines a taken image received within a given allowed time based on the timing of transmission of the taken image of the transmission target as the taken image of the transmission target. If the acquired taken image is not the taken image of the transmission target (No in S12), the processing makes transition to S12 again.

On the other hand, if the acquired taken image is the taken image of the transmission target (Yes in S12), the detecting unit 71 executes the detection processing of an AR marker for the taken image (S13).

The generating unit 72 determines whether or not an AR marker is detected in the taken image (S14). If an AR marker is not detected in the taken image (No in S14), the processing makes transition to the above-described S12.

If an AR marker is detected in the taken image (Yes in S14), the generating unit 72 generates a superposition image by executing processing of superimposing an image corresponding to the AR marker on the taken image (S15). When an update timing based on the Miracast comes, the transmitting unit 73 transmits image data of the generated superposition image to the head-mounted display 12 (S16).

The detecting unit 71 determines whether or not to end the processing (S17). For example, when accepting given instruction operation for the processing end, the detecting unit 71 determines to end the processing. If it is determined to end the processing (Yes in S17), the processing is ended.

On the other hand, if the processing is not ended (No in S17), the processing makes transition to the above-described S12.

In this manner, the image processing control apparatus 11 according to the present embodiment sequentially acquires taken images. The image processing control apparatus 11 executes the detection processing of the reference object regarding the taken images of the transmission target among the plural taken images acquired. The image processing control apparatus 11 generates superposition images by executing processing of superimposing an image corresponding to the reference object detected by the detection processing on the taken images of the transmission target. The image processing control apparatus 11 transmits the generated superposition images. This allows the image processing control apparatus 11 to suppress the power consumption.

Furthermore, the image processing control apparatus 11 according to the present embodiment does not execute the detection processing regarding the taken images that are not deemed as the transmission target among the plural taken images. This allows the image processing control apparatus 11 to skip the unnecessary detection processing regarding the taken images that are not deemed as the transmission target. Thus, the processing load may be reduced and the power consumption may be suppressed.

Moreover, the image processing control apparatus 11 according to the present embodiment transmits superposition images to the head-mounted display 12 at a given cycle. This allows the image processing control apparatus 11 to cause the head-mounted display 12 to display the superposition images.

Embodiment 2

Next, embodiment 2 will be described. The configurations of the system 10 and the head-mounted display 12 according to embodiment 2 are substantially the same as those of embodiment 1 illustrated in FIG. 1 and FIG. 2 and therefore description thereof is omitted.

Figure 8:
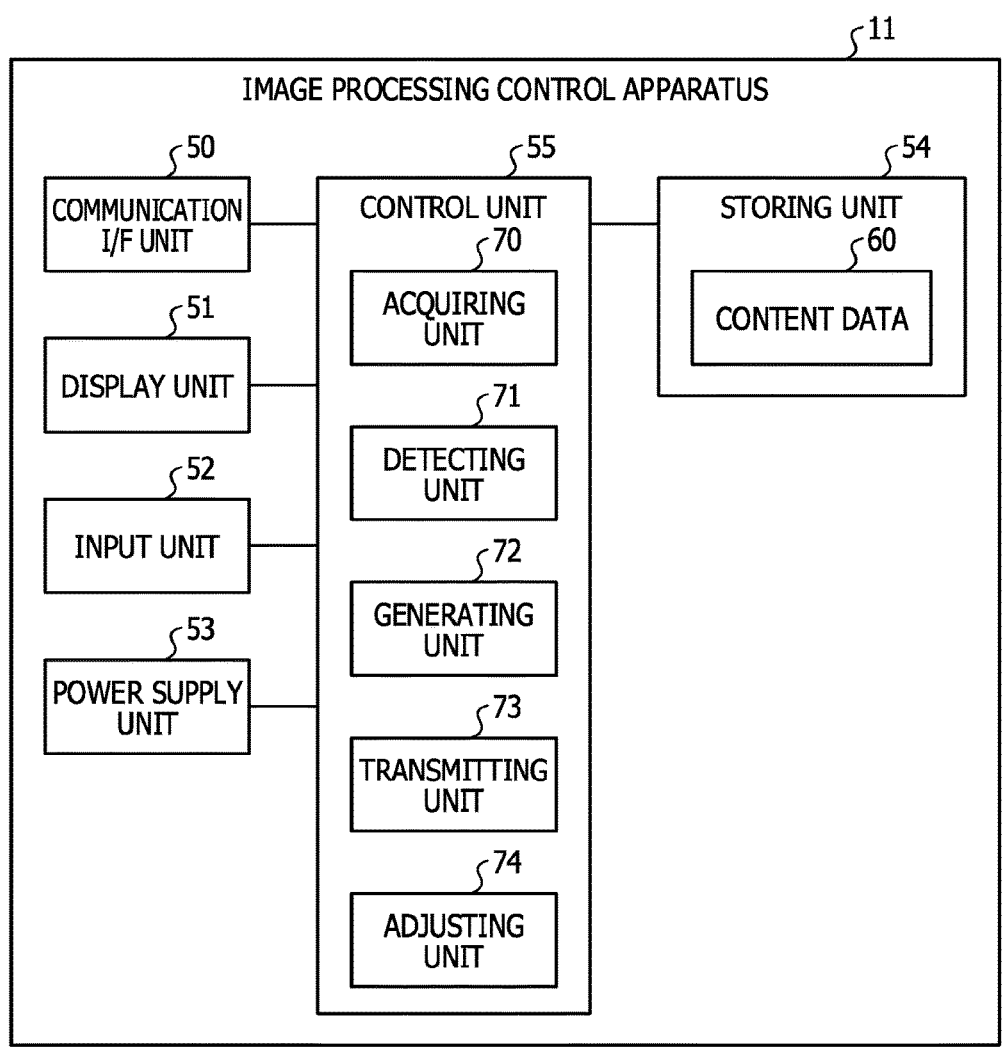
FIG. 8 is a diagram schematically illustrating a functional configuration of an image processing control apparatus according to embodiment 2.

FIG. 8 is a diagram schematically illustrating a functional configuration of an image processing control apparatus according to embodiment 2. The configuration of the image processing control apparatus 11 according to embodiment 2 is substantially the same as embodiment 1 illustrated in FIG. 3. Therefore, the same parts are given the same numerals and a different part will be mainly described.

As illustrated in FIG. 8, the control unit 55 of the image processing control apparatus 11 further includes an adjusting unit 74.

The adjusting unit 74 carries out various kinds of adjustment. The adjusting unit 74 adjusts the photographing cycle of the taken image according to the transmission cycle of the superposition image. For example, the adjusting unit 74 obtains a transmission time Tr it takes to transmit image data of a taken image from the head-mounted display 12 to the image processing control apparatus 11. For example, the adjusting unit 74 causes image data or test data with a given data amount to be transmitted from the head-mounted display 12 to the image processing control apparatus 11 and measures the transmission time it takes to transmit the data. The adjusting unit 74 divides the data amount of the image data or the test data by the transmission time to obtain the transfer rate of the data. Furthermore, the adjusting unit 74 averages the data amount of image data of plural taken images to obtain the standard data amount of the taken image. Then, the adjusting unit 74 divides the standard data amount of the taken image by the transfer rate to obtain the transmission time Tr it takes to transmit image data of the taken image. Based on the transmission cycle of the superposition image, the adjusting unit 74 obtains the photographing timing with which the clock time in the case in which the image processing of superimposing an image corresponding to an AR marker is executed for a taken image transmitted from the head-mounted display 12 is immediately before the next update timing of the image based on the Miracast.

Figure 9:
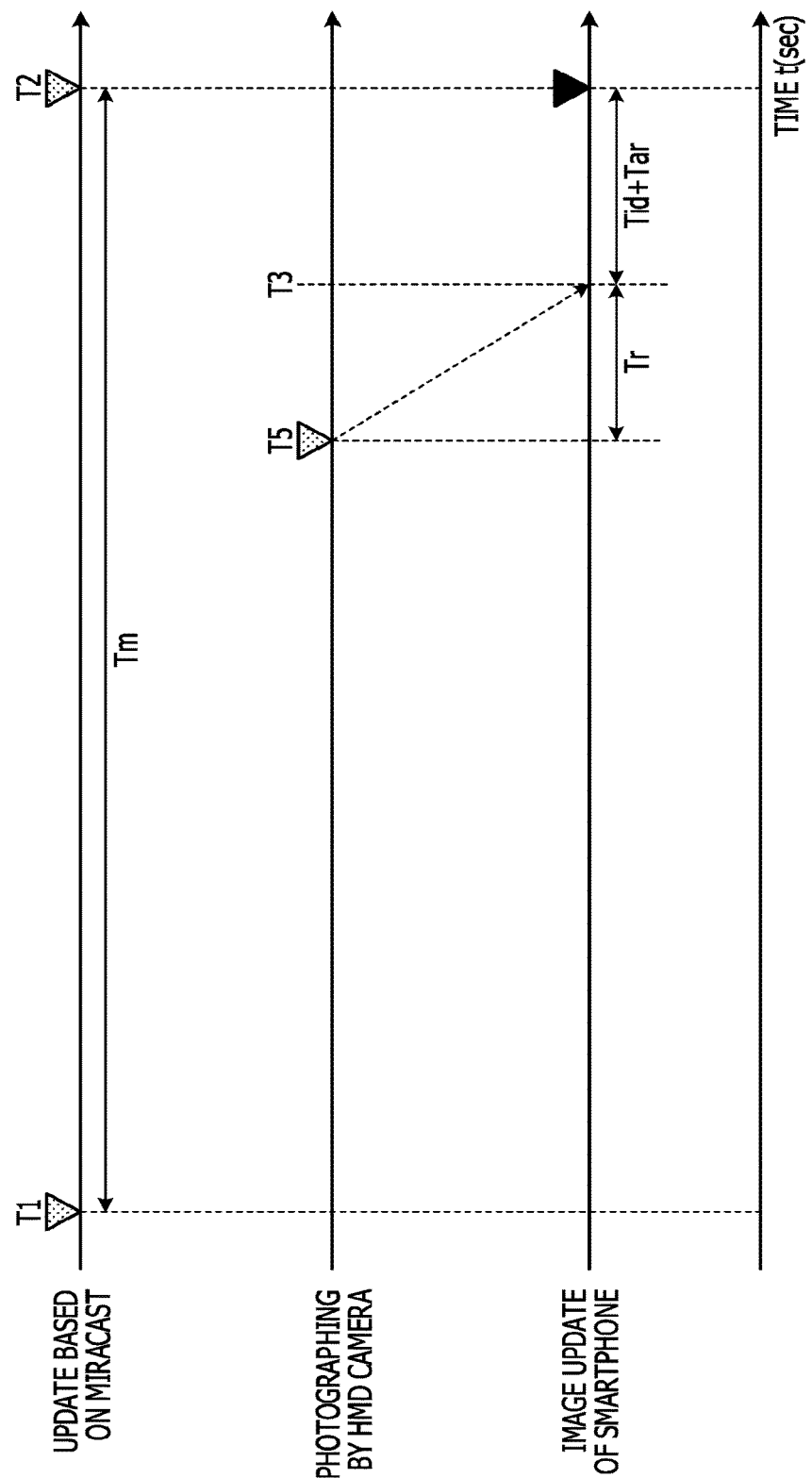
FIG. 9 is a diagram illustrating one example of how to obtain a photographing timing.

FIG. 9 is a diagram illustrating one example of how to obtain a photographing timing. In FIG. 9, the immediately-previous update timing T1 based on Miracast and the clock time T2 after the time interval Tm from the update timing T1 are represented as with FIG. 5. Furthermore, in FIG. 9, the clock time T3 earlier than the clock time T2 by detection time Tid+AR content display processing time Tar is represented. The adjusting unit 74 obtains a clock time T5 earlier than the clock time T3 by the transmission time Tr. The adjusting unit 74 notifies the head-mounted display 12 of the clock time T5 as the photographing timing. If a time lag is caused in the respective processing times, the case will be possible in which generation of a superposition image has not been completed by the update timing of the image based on the Miracast. Therefore, the adjusting unit 74 may notify the head-mounted display 12 of a clock time regarding which a certain margin time is set in advance. For example, the adjusting unit 74 may notify the head-mounted display 12 of the clock time earlier than the clock time T5 by the certain margin time.

The head-mounted display 12 photographs an image at the clock time T5 and transmits image data of the taken image to the image processing control apparatus 11. The detecting unit 71 deems the taken image acquired from the head-mounted display 12 as the taken image of the transmission target and executes the detection processing of the reference object. If an AR marker is detected in the taken image, the generating unit 72 generates a superposition image by executing processing of superimposing an image corresponding to the AR marker for the taken image in which the AR marker is detected. When an update timing based on the Miracast comes, the transmitting unit 73 transmits, to the head-mounted display 12, image data of the image of the screen displayed at the update timing. Due to this, in the head-mounted display 12, only the taken images to be displayed through superposition of AR content are photographed and thus the power consumption may be suppressed. Furthermore, the image processing control apparatus 11 becomes free from the superposition processing of the image for the taken images that are not transmitted to the head-mounted display 12 and thus the power consumption may be suppressed.

As above, the image processing control apparatus 11 according to the present embodiment adjusts the photographing cycle of the taken image according to the transmission cycle of the superposition image. This allows the image processing control apparatus 11 to suppress photographing of unnecessary taken images.

Embodiment 3

Although the embodiments relating to the apparatus of the disclosure are described thus far, techniques of the disclosure may be carried out in various different modes besides the above-described embodiments. Therefore, in the following, other embodiments included in techniques of the disclosure will be described.

For example, in the above-described embodiments, description is made by taking the case in which the image processing control apparatus 11 is a portable information processing apparatus such as a smartphone or a tablet terminal as an example. However, the apparatus of the disclosure is not limited thereto. For example, the image processing control apparatus 11 may be a computer such as a personal computer or a server computer. Furthermore, the image processing control apparatus 11 may be allowed to communicate with the head-mounted display 12 through an arbitrary kind of communication network such as a mobile communication network, the Internet, or a LAN irrespective of whether the communication network is a wired communication network or a wireless communication network.

Furthermore, in the above-described embodiments, description is made by taking the case in which the image processing of superimposing AR content is executed only for the taken images of the transmission target as an example. However, the apparatus of the disclosure is not limited thereto. For example, when operation input to the input unit 52 is detected, the image processing control apparatus 11 may execute the image processing of superimposing AR content only for the respective taken images sequentially acquired by the acquiring unit 70 for a given period. Due to this, for example, when a user makes operation input to the input unit 52 of the image processing control apparatus 11, the respective taken images on which the AR content is superimposed are displayed on the display unit 51.

Moreover, the respective constituent elements of the respective apparatuses illustrated in the drawings are functionally conceptual elements and do not necessarily need to be configured as illustrated in the drawings physically. For example, the concrete state of distribution and integration of the respective apparatuses is not limited to that illustrated in the drawings and all or part of the apparatuses may be so configured as to be distributed or integrated functionally or physically in arbitrary unit depending on various kinds of loads, the use status, and so forth. For example, the respective processing units of the acquiring unit 70, the detecting unit 71, the generating unit 72, the transmitting unit 73, and the adjusting unit 74 may be integrated as appropriate. Moreover, all or an arbitrary part of the respective processing functions carried out in the respective processing units may be implemented by a CPU and a program analyzed and executed in this CPU or may be implemented as hardware based on wired logic.

[Image Processing Control Program]

Figure 10:
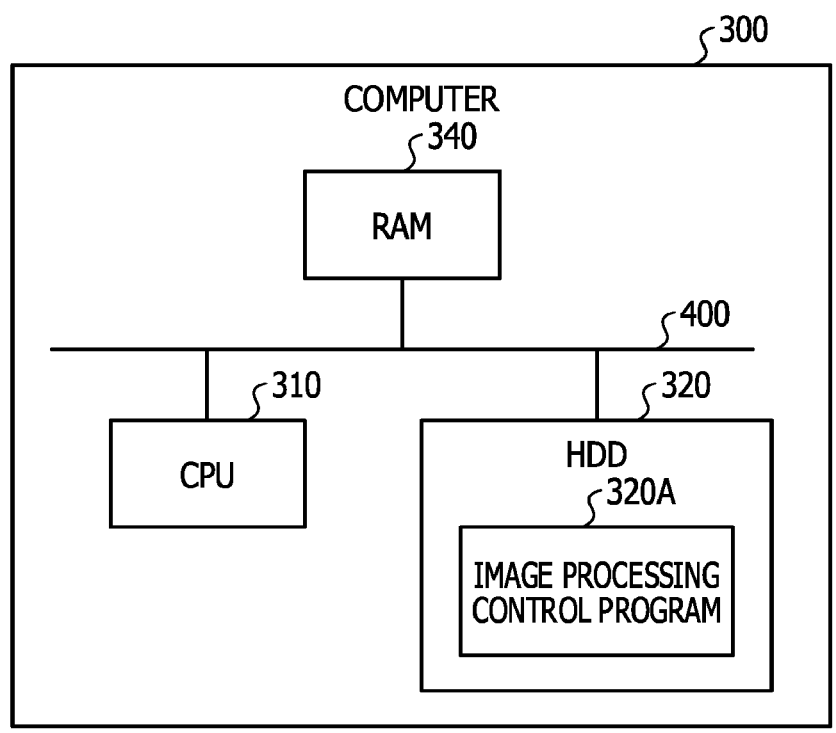
FIG. 10 is a diagram illustrating one example of a computer that executes an image processing control program.

Furthermore, it is also possible to implement various kinds of processing explained in the above-described embodiments by executing a program prepared in advance by a computer system such as a personal computer or a workstation. Accordingly, in the following, one example of a computer system that executes a program including the like functions as the above-described embodiments will be described. FIG. 10 is a diagram illustrating one example of a computer that executes an image processing control program.

As illustrated in FIG. 10, a computer 300 includes a CPU 310, a hard disk drive (HDD) 320, and a RAM 340. These respective units of 310 to 340 are coupled via a bus 400.

An image processing control program 320A that exerts the like functions as the above-described acquiring unit 70, detecting unit 71, generating unit 72, transmitting unit 73, and adjusting unit 74 is stored in the HDD 320 in advance. The image processing control program 320A may be split as appropriate.

Furthermore, the HDD 320 stores various kinds of information. For example, the HDD 320 stores an OS and various kinds of data used for various kinds of processing.

Furthermore, the CPU 310 reads out the image processing control program 320A from the HDD 320 and executes the image processing control program 320A. Thereby, the image processing control program 320A carries out the like operation as the respective processing units of the embodiments. For example, the image processing control program 320A carries out the like operation as the acquiring unit 70, the detecting unit 71, the generating unit 72, the transmitting unit 73, and the adjusting unit 74.

The above-described image processing control program 320A does not necessarily need to be stored in the HDD 320 from the beginning.

Furthermore, for example, as the image processing control program 320A, a program may be stored in "portable physical media" such as a compact disc read only memory (CD-ROM), a digital versatile disc (DVD), a magneto-optical disc and an integrated circuit (IC) card inserted in the computer 300. In addition, the computer 300 may read out the program from these media and execute the program.

Moreover, the program may be stored in "another computer (or server)" coupled to the computer 300 through a public line, the Internet, a LAN, a wide area network (WAN), or the like. Furthermore, the computer 300 may read out the program from these computers and execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control method executed by a computer, the control method comprising:

acquiring a first image;

determining whether the first image is a transmission target to another computer;

when the determining determines that the first image is an image as the transmission target, executing detection processing of detecting a reference object from the image, generating image information of a superposition image in which a content image corresponding to the reference object detected by the detection processing is superimposed over the image when the reference object is detected from the image, transmitting the image information to the other computer, and acquiring a second image which is photographed after the first image for a next determining, wherein when the determining determines that the first image is not the transmission target, the detection processing and the generating of the image information is not performed relative to the first image and the second image is acquired for the next determining.

2. The control method according to claim 1, wherein a plurality of images including the first image and the second image are sequentially received from an image sensor that photographs the plurality of images.

3. The control method according to claim 2, wherein the first image is determined to be the transmission target when the first image is received from the image sensor within a given time based on a timing at which the transmission target is transmitted to the other computer.

4. The control method according to claim 3, wherein the timing is decided based on a certain transmission cycle.

5. The control method according to claim 4, further comprising:
adjusting a photographing cycle of the image sensor according to the transmission cycle.

6. The control method according to claim 2, wherein
the image sensor is included in a camera in a head-mounted display, and
the head-mounted display transmits the plurality of images to the computer.

7. The control method according to claim 6, wherein
the other computer is the head-mounted display including a display, and
the display displays the superposition image based on the image information.

8. The control method according to claim 1, wherein
the computer includes a first display,
the other computer is a head mounted display device including a second display,
the first display and the second display display the superposition image according to a transmission cycle of the image information from the computer to the other computer.

9. A control device comprising:
a memory; and
a processor coupled to the memory and configured to:
acquire a first image,
determine whether the first image is a transmission target to another computer,
when the determining determines that the first image is an image as the transmission target,
execute detection processing of detecting a reference object from the image,
generate image information of a superposition image in which a content image corresponding to the reference object detected by the detection processing is superimposed over the image when the reference object is detected from the image,
transmit the image information to the other computer, and
acquire a second image which is photographed after the first image for a next determining,
wherein when the processor determines that the first image is not image as the transmission target, the processor does not perform the detection processing and generating of the image information relative to the first image and the processor acquires the second image for the next determining.

10. The control device according to claim 9, wherein a plurality of images including the first image and the second image are sequentially received from an image sensor that photographs the plurality of images.

11. The control device according to claim 10, wherein the first image is determined to be the transmission target when the first image is received from the image sensor within a given time based on a timing at which the transmission target is transmitted to the other computer.

12. The control device according to claim 11, wherein the timing is decided based on a certain transmission cycle.

13. The control device according to claim 12, further comprising:
adjusting a photographing cycle of the image sensor according to the transmission cycle.

14. The control device according to claim 10, wherein
the image sensor is included in a camera in a head-mounted display, and
the head-mounted display transmits the plurality of images to the control device.

15. The control device according to claim 14, wherein
the other computer is the head-mounted display including a display, and
the display displays the superposition image based on the image information.

16. The control device according to claim 9, wherein
the computer includes a first display,
the other computer is a head mounted display device including a second display,
the first display and the second display display the superposition image according to a transmission cycle of the image information from the computer to the other computer.

17. A non-transitory computer-readable storage medium storing a control program that causes a computer to execute a process, the process comprising:
acquiring a first image;
determining whether the first image is a transmission target to another computer;
when the determining determines that the first image is an image as the transmission target,
executing detection processing of detecting a reference object from the image,
generating image information of a superposition image in which a content image corresponding to the reference object detected by the detection processing is superimposed over the image when the reference object is detected from the image,
transmitting the image information to the other computer, and
acquiring a second image which is photographed after the first image for next determining,
wherein when the determining determines that the first image is not the transmission target, the detection processing and the generating of the image information is not performed relative to the first image and the second image is acquired for the next determining.

* * * * *